United States Patent
Ohtsuka et al.

(10) Patent No.: US 6,917,367 B2
(45) Date of Patent: Jul. 12, 2005

(54) DISPLAY UNIT, DISPLAY CONTROL DEVICE AND DISPLAY DEVICE

(75) Inventors: Syouji Ohtsuka, Tokyo (JP); Kazuya Maeshima, Tokyo (JP); Kenichi Kawasaki, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 376 days.

(21) Appl. No.: 09/754,361

(22) Filed: Jan. 5, 2001

(65) Prior Publication Data

US 2002/0003544 A1 Jan. 10, 2002

(30) Foreign Application Priority Data

Jul. 3, 2000 (JP) .................................... P2000-200875

(51) Int. Cl.[7] .................................................. G09G 5/02
(52) U.S. Cl. ......................... 345/589; 345/88; 345/84; 345/83; 345/590; 345/600
(58) Field of Search ............................. 345/88, 84, 83, 345/600, 590, 589, 840

(56) References Cited

U.S. PATENT DOCUMENTS

| | | | |
|---|---|---|---|
| 6,219,011 B1 * | 4/2001 | Aloni et al. ................ | 345/1.3 |
| 6,243,059 B1 * | 6/2001 | Greene et al. ............... | 345/88 |
| 6,313,816 B1 * | 11/2001 | Kojima et al. ............... | 345/83 |
| 6,493,008 B1 * | 12/2002 | Yui ............................ | 345/840 |
| 6,583,791 B2 * | 6/2003 | Berryman et al. .......... | 345/589 |

FOREIGN PATENT DOCUMENTS

| | | |
|---|---|---|
| JP | 3-186890 | 8/1991 |
| JP | A8317414 | 11/1996 |
| JP | 2001-324971 | 11/2001 |
| WO | WO 97/36281 | 10/1997 |
| WO | WO 99/29117 | 6/1999 |

* cited by examiner

*Primary Examiner*—Kimbinh T. Nguyen
(74) *Attorney, Agent, or Firm*—Birch, Stewart, Kolasch & Birch, LLP (57) ABSTRACT

Each of display units (40) constituting a display portion (30) of a display device (100) comprises a memory portion which stores display characteristics information (CL) of a light emitting portion, a chromaticity conversion parameter (P) and the like. A chromaticity range determination portion in a display control portion (20) receives the display characteristics information (CL) through a transmission line (20L) and determines a predetermined chromaticity range common to all the display units (40). An operation portion in the display control portion (20) calculates the chromaticity conversion parameter (P) used for achieving the predetermined chromaticity range for each of the display units (40) and transmits the parameter to each of the display units (40) through a transmission line (20L). A chromaticity converter portion in each of the display units (40) converts chromaticity of image data (D) on the basis of the received parameter (P). The display unit (40) displays an image on the basis of the converted image data. The display device (100) can automatically control the chromaticity by display units.

13 Claims, 10 Drawing Sheets

DISPLAY UNIT, DISPLAY CONTROL DEVICE AND DISPLAY DEVICE

BACKGROUND OF THE INVENTION

1. Field of the Invention

The present invention relates to a large scale display device (hereinafter, also refereed to simply as "display device") used for e.g., a baseball stadium and a race track, in which a plurality of display units constitute a screen or a display portion, and more particularly to a technique for uniformizing color tone on the whole display portion.

2. Description of the Background Art

A large scale display device is constituted of a plurality of arranged display units consisting of a number of display elements (e.g., LEDs (light emitting diodes)) and circuits for driving and controlling the display elements. Such a display device is required to uniformize a display on the whole screen, and therefore a variety of proposals on manufacture have been made in order to equalize chromaticity, luminance and the like of each color among the display units.

For example, there are variations in chromaticity (wavelength) and luminance of the LEDs among the display elements caused through manufacturing process. For this reason, the LEDs are classified into several ranks by chromaticity (wavelength), luminance and the like in the final test process, and then put in the manufacturing process of the display unit. For example, only the LEDs of limited ranks are selected for one display device and separated (dispersed) by colors on the whole display device. Thus, in the background-art large scale display device, the chromaticity of the whole screen is uniformized by controlling the parts in the manufacturing process.

Further, in the background-art large scale display device, a desired color is obtained by converting the chromaticity of all the display units (in other words, the whole screen of the display device) on the basis of a single (the same) parameter.

In the background-art large scale display device, the chromaticity and the like on the whole device are controlled and set in advance as above. Therefore, when some of a plurality of display units constituting the display device need to be changed or another display unit needs to be added after assembly process for enlargement of the display device, some problem arises. Specifically, first, since the LEDs to be used are classified and limited as discussed above, it is difficult to manufacture the display unit of the same chromaticity later. Further, since the chromaticity on the whole display device is controlled on the basis of a single parameter, it is difficult to equalize the chromaticity of the original display unit and that of changed or added one.

As one of possible solutions for this problem is a constitution in which the chromaticity of each display unit is variable. In such a constitution, however, individual display units have to be controlled. Further, whether the target chromaticity (chromaticity range) is proper or not, or whether all the display units can be controlled to the target chromaticity or not is not sure until the control of the whole display device is completed. In other words, when it is found that the target chromaticity is not proper after the control and when a display unit which can not be controlled to the target chromaticity is found on the way of control, it is necessary to change the target chromaticity and control the chromaticity of the display unit again. Thus, in the constitution where the chromaticity of each display unit is merely variable, there is a problem of needing a lot of time to control the whole display device.

Furthermore, the above problem may arise in a constitution where the light emitting portion of the display unit is constituted of a plurality of sub-units each changeable or individually controllable.

SUMMARY OF THE INVENTION (1) The present invention is directed to a display unit. According to a first aspect of the present invention, the display unit is a constituent element of a display portion of a display device, the display portion includes a plurality of display units which are arranged, and the display unit comprises: a light emitting portion for emitting a display light; a memory portion for storing information including display characteristics information of the light emitting portion and a chromaticity conversion parameter obtained on the basis of the display characteristics information; and a chromaticity converter portion receiving image data and the chromaticity conversion parameter, for converting chromaticity of the image data on the basis of the chromaticity conversion parameter.

(2) According to a second aspect of the present invention, the display unit of the first aspect further comprises: an operation portion receiving chromaticity range information on a predetermined chromaticity range including a chromaticity range common to the plurality of display units constituting the display portion and the display characteristics information, for obtaining the chromaticity conversion parameter on the basis of the chromaticity range information and the display characteristics information.

(3) According to a third aspect of the present invention, in the display unit of the first aspect, the light emitting portion is divided into a plurality of blocks, the information includes information on each of the plurality of blocks, and the chromaticity converter portion converts chromaticity of the image data for each of the blocks on the basis of the chromaticity conversion parameter for each of the plurality of blocks.

(4) According to a fourth aspect of the present invention, the display unit of the third aspect further comprises an operation portion receiving chromaticity range information on a predetermined chromaticity range including a chromaticity range common to the plurality of display units constituting the display portion and the display characteristics information on each of the plurality of blocks, for obtaining the chromaticity conversion parameter for each of the plurality of blocks on the basis of the chromaticity range information and the display characteristics information on each of the plurality of blocks.

(5) According to a fifth aspect of the present invention, the display unit of any one of the first to fourth aspects further comprises: a received-signal processing portion receiving a mixed signal in which a plurality of signals including the image data are mixed, for separating the mixed signal into the plurality of signals.

(6) The present invention is also directed to a display control device. According to a sixth aspect of the present invention, the display control device controls display of a plurality of display units which are arranged to constitute a display portion of a display device, each of the plurality of display units has a light emitting portion for emitting a display light and stores information including display characteristics information of the light emitting portion, the display control device is provided outside the plurality of display units communicably therewith, and the display control device comprises: a chromaticity range determination portion receiving the display characteristics information from each of the plurality of display units, for determining a predetermined chromaticity range including a chromaticity range common to the plurality of display units on the basis of all the display characteristics information.

(7) According to a seventh aspect of the present invention, the display control device of the sixth aspect further comprises: an operation portion receiving chromaticity range information on the predetermined chromaticity range and the display characteristics information on each of the plurality of display units, for obtaining a chromaticity conversion parameter for each of the plurality of display units on the basis of the chromaticity range information and the display characteristics information.

(8) According to an eighth aspect of the present invention, in the display control device of the sixth aspect, the light emitting portion of each of the plurality of display units is divided into a plurality of blocks, the information includes information on each of the plurality of blocks, and the chromaticity range determination portion determines a chromaticity range including a chromaticity range common to all the plurality of blocks of the plurality of display units as the predetermined chromaticity range on the basis of the display characteristics information of all the plurality of blocks.

(9) According to a ninth aspect of the present invention, the display control device of the eighth aspect further comprises: an operation portion receiving chromaticity range information on the predetermined chromaticity range and the display characteristics information on each of the plurality of blocks, for obtaining the chromaticity conversion parameter for each of the plurality of blocks on the basis of the chromaticity range information and the display characteristics information on each of the plurality of blocks.

(10) The present invention is further directed to a display device. According to a tenth aspect of the present invention, the display device comprises: a display portion constituted of a plurality of display units which are arranged; a display control device provided outside the plurality of display units communicably therewith, for controlling display of the plurality of display units; and an operation portion, and in the display device of the tenth aspect, each of the plurality of display units comprises: a light emitting portion for emitting a display light; a memory portion for storing information including display characteristics information of the light emitting portion and a chromaticity conversion parameter obtained on the basis of the display characteristics information; and a chromaticity converter portion receiving image data and the chromaticity conversion parameter, for converting chromaticity of the image data on the basis of the chromaticity conversion parameter, the display control device comprises: a chromaticity range determination portion receiving the display characteristics information from each of the plurality of display units, for determining a predetermined chromaticity range including a chromaticity range common to the plurality of display units on the basis of all the display characteristics information, and the operation portion receives chromaticity range information on the predetermined chromaticity range and the display characteristics information on each of the plurality of display units, for obtaining the chromaticity conversion parameter for each of the plurality of display units on the basis of the chromaticity range information and the display characteristics information.

(11) According to an eleventh aspect of the present invention, in the display device of the tenth aspect, the operation portion is provided inside the display control device, and the display control device transmits the chromaticity conversion parameter obtained in the operation portion to corresponding one of the plurality of display units.

(12) According to a twelfth aspect of the present invention, in the display device of the eleventh aspect, the light emitting portion of each of the plurality of display units is divided into a plurality of blocks, the information includes information on each of the plurality of blocks, the chromaticity converter portion of each of the plurality of display units converts chromaticity of the image data for each of the blocks on the basis of the chromaticity conversion parameter for each of the plurality of blocks, the chromaticity range determination portion of the display control device determines a chromaticity range including a chromaticity range common to all the plurality of blocks of the plurality of display units as the predetermined chromaticity range on the basis of the display characteristics information of all the plurality of blocks, and the operation portion provided inside the display control device receives chromaticity range information on the predetermined chromaticity range and the display characteristics information on each of the plurality of blocks, for obtaining the chromaticity conversion parameter for each of the plurality of blocks on the basis of the chromaticity range information and the display characteristics information on each of the plurality of blocks.

(13) According to a thirteenth aspect of the present invention, in the display device of the tenth aspect, the operation portion includes a plurality of operation portions, each of the plurality of operation portions is provided inside each of the plurality of display units, and the display control device transmits the chromaticity range information to each of the plurality of display units.

(14) According to a fourteenth aspect of the present invention, in the display device of the thirteenth aspect, the light emitting portion of each of the plurality of display units is divided into a plurality of blocks, the information includes information on each of the plurality of blocks, the chromaticity converter portion of each of the plurality of display units converts chromaticity of the image data for each of the blocks on the basis of the chromaticity conversion parameter for each of the plurality of blocks, the chromaticity range determination portion of the display control device determines a chromaticity range including a chromaticity range common to all the plurality of blocks of the plurality of display units as the predetermined chromaticity range on the basis of the display characteristics information of all the plurality of blocks, and the operation portion provided inside each of the display units receives chromaticity range information on the predetermined chromaticity range and the display characteristics information on each of the plurality of blocks, for obtaining the chromaticity conversion parameter for each of the plurality of blocks on the basis of the chromaticity range information and the display characteristics information on each of the plurality of blocks.

(1) In the display unit of the first aspect of the present invention, the chromaticity converter portion converts the chromaticity of the image data on the basis of the chromaticity conversion parameter. At this time, since the chromaticity conversion parameter is obtained (defined) on the basis of the display characteristics information of the light emitting portion, the chromaticity of the display image can be controlled for each of the display units when a plurality of arranged display units constitute the display portion of the display device. Therefore, it is possible to provide the display device which displays an image of uniform color tone on the whole display portion.

(2) Since the display unit of the second aspect of the present invention comprises the operation portion, the chromaticity conversion parameters can be obtained individually or in parallel in a unit of the display unit of the above display device. Therefore, it is possible to provide the display device which allows reduction in time for calculation of the chromaticity conversion parameter and further time for control of the chromaticity as compared with a case where the display device has a single operation portion and the chromaticity conversion parameters for all the display units are obtained in the operation portion.

(3) In the display unit of the third aspect of the present invention, the light emitting portion is divided into a plurality of blocks and the chromaticity converter portion converts the chromaticity of the image data for each of the blocks on the basis of the chromaticity conversion parameters for each of the blocks, Accordingly, the chromaticity of the display image can be controlled for each of the blocks, Therefore, it is possible to obtain an image of uniform color tone on the whole of display units.

Further, sine the light emitting portion is divided into a plurality of blocks, even if some problem arises in the light emitting portion, it is only necessary to change the block with the problem. In other words, it is possible to reduce the number of parts to be changed as compared with the display unit in which the whole light emitting portion has to be changed.

(4) Since the display unit of the fourth aspect of the present invention comprises the operation portion, the chromaticity conversion parameters can be obtained individually or in parallel in a unit of the display unit in the above display device. Therefore, it is possible to provide the display device which allows reduction in time for calculation of the chromaticity conversion parameters for all the display units are obtained in the operation portion.

(5) In the display unit of the fifth aspect of the present invention, by applying the received-signal processing portion to an input stage of the display unit, the number of lines (transmission lines) connected to the display units can be reduced. Therefore, it is possible to facilitate interconnection of the lines in the display device and improve workability in assembling work and the like of the display device.

(6) Since the display control device of the sixth aspect of the present invention is provided communicable with each of the display units, the chromaticity range determination portion can automatically receive the display characteristics information from each of the display units by means of this communication function. Further, the display control device can automatically control the chromaticity of each of the display units by means of this communicating function.

(7) The display control device of the seventh aspect of the present invention comprises the operation portion. Therefore, the display device which controls the display of a plurality of display units by one display control device needs less cost for parts than a display device in which each of the display units comprises the operation portion.

(8) In the display control device of the eighth aspect of the present invention, the chromaticity range determination portion determines the chromaticity range including the chromaticity range common to all the blocks of a plurality of display units as the predetermined chromaticity range on the basis of the display characteristics information of all the blocks. Therefore, it is possible to obtain an image of uniform color tone on the whole of display units.

(9) The display control device of th ninth aspect of the present invention comprises the operation portion. Therefore, the display device which controls the display of a plurality of display units by one display control device needs less cost for parts than a display device in which each of the display units comprises the operation portion.

(10) In the display device of the tenth aspect of the present invention, since each of the display units has the information including the display characteristics information of the light emitting portion and the like and the operation portion obtains the chromaticity conversion parameter for each of the display units. Therefore, it is possible to obtain an image of uniform color tone on the whole display portion of the display device. Moreover, the display device and automatically control the chromaticity of the display portion.

(11) In the display device of the eleventh aspect of the present invention, since the operation portion is provided inside the display control device, it is possible to reduce the cost for parts as compared with a case where the operation portion is provided in each of the display units. Further, the display control device transmits each chromaticity conversion parameter to corresponding one of the display units. Therefore, the display control device can automatically perform a series of processings, i.e., receiving the information from each of the display units, obtaining the predetermined chromaticity range information and the chromaticity conversion parameter for each of the display units and transmitting each chromaticity conversion parameter.

(12) The display device of the twelfth aspect of the present invention can produce the effects of the third, ninth and eleventh aspects at the same time.

(13) In the display device of the thirteenth aspect of the present invention, since the operation portion is provided inside each of the display units, the chromaticity conversion parameters can be obtained individually or in parallel in a unit of the display unit. Further, the chromaticity range information is common (or equal) to all the display units, the chromaticity range information can be transmitted to all the display units collectively (or at the same time). Therefore, it is possible to reduce time for calculation of the chromaticity conversion parameter and further time for control of the chromaticity as compared with a case where the display device has a single operation portion and the chromaticity conversion parameters for all the display units are obtained in the operation portion.

(14) The display device of the fourteenth aspect of the present invention can produce the effects of the fourth, eighth and thirteenth aspects at the same time.

A first object of the present invention is to provide a display device which can control the chromaticity of each of the display units and obtain an image of uniform color tone on the whole display portion.

A second object of the present invention is to provide a display device which can automatically control the chromaticity for each of the display units.

A third object of the present invention is to provide a display device which needs less cost of parts or can reduce time for control of the chromaticity.

A fourth object of the present invention is to provide a display unit and a display control device which can achieve the first to third objects.

These and other objects, features, aspects and advantages of the present invention will become more apparent from the following detailed description of the present invention when taken in conjunction with the accompanying drawings.

DESCRIPTION OF THE PREFERRED EMBODIMENTS

<The First Preferred Embodiment>

A. Constitution of Large Scale Display Device 100

Figure 1:
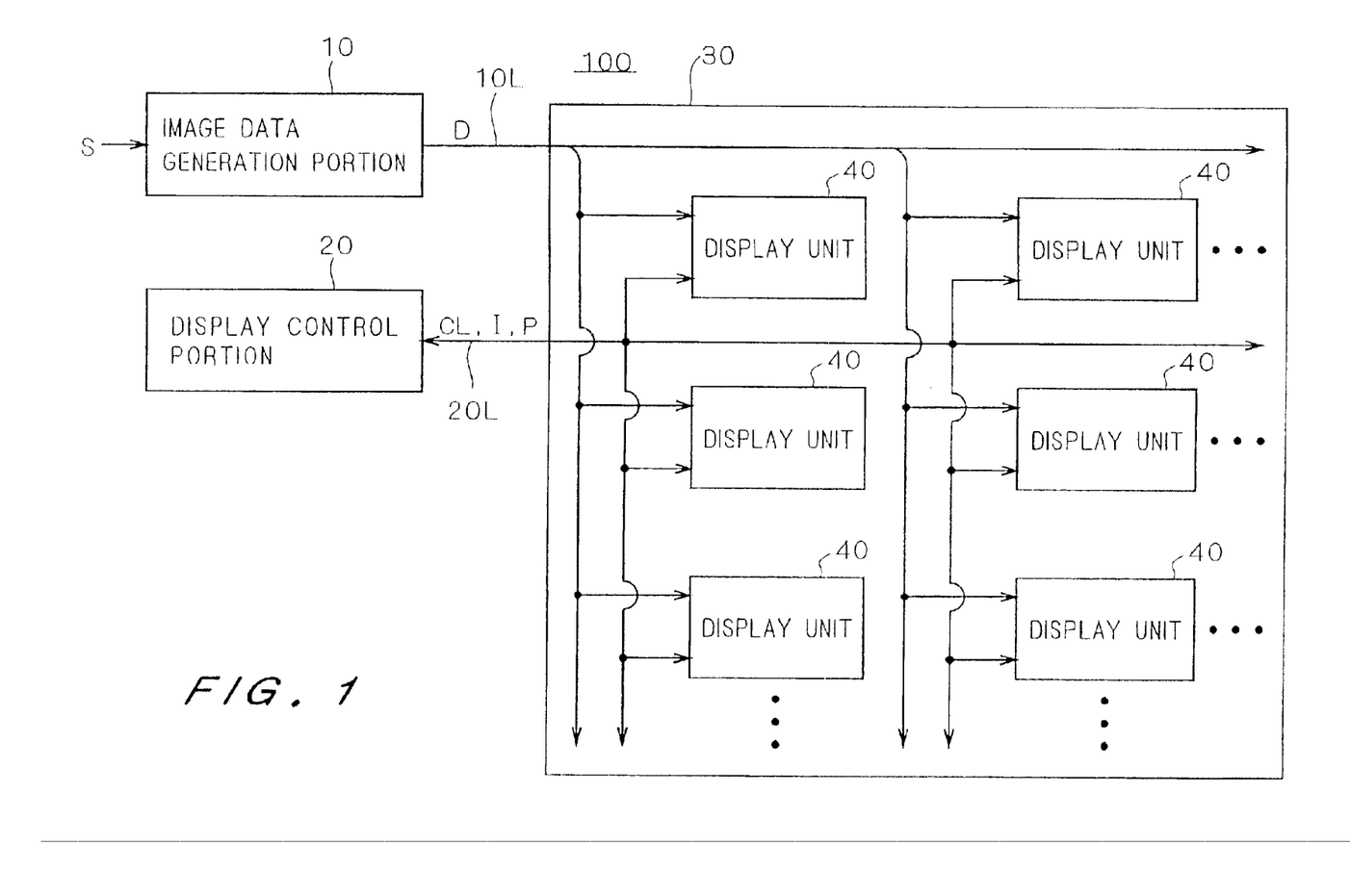
FIG. 1 is a view schematically showing a constitution of a display device in accordance with a first preferred embodiment of the present invention.

FIG. 1 is a view schematically showing a constitution of a large scale display device (hereinafter, also refereed to simply as "display device") 100 in accordance with the first preferred embodiment. As shown in FIG. 1, the display device 100 comprises a display portion 30 and an image data generation portion 10 and a display control portion (or display control device) 20 both arranged outside the display portion 30. The display portion 30 is constituted of a plurality of display units 40 which are arranged, e.g., in matrix, and each display unit 40 is connected to the image data generation portion 10 through an image data transmission line 10L. Further, though FIG. 1 shows a constitution in which the transmission line 10L is so provided as to transmit image data D common to each group of vertically-arranged display units 40, there may be a constitution in which all the display units 40 are commonly connected through a (high capacity) transmission line 10L or in which one transmission line 10L is provided for each display unit.

The display control portion 20 controls a display of the display portion 30, in other words, all the display units 40. Particularly, each of the display units 40 and the display control portion 20 are connected through a transmission line (or communication line) 20L, allowing two-way (or interactive) communication of various information. Further, like the case of the above transmission line 10L, a variety of connections between the display units 40 and the display control portion 20 through the transmission line 20L can be applied.

A-1. Image Data Generation Portion 10

Figure 2:
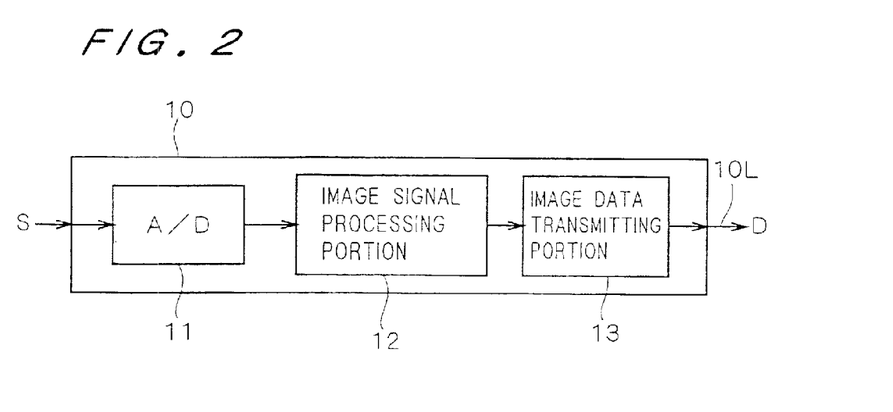
FIG. 2 is a view schematically showing a constitution of an image data generation portion in accordance with the first preferred embodiment of the present invention.

FIG. 2 is a view schematically showing a constitution of the image data generation portion 10 in accordance with the first preferred embodiment. The image data generation portion 10 comprises an analog/digital converter portion (hereinafter, also referred to as "A/D converter portion" and represented as "A/D" in the figures) 11, an image signal processing portion 12 and an image data transmitting portion 13.

In more detail, an analog image signal S inputted to the image data generation portion 10 is first converted into a digital signal in the A/D converter portion 11. Then, the image signal processing portion 12 performs a digital image processing such as γ conversion and resolution conversion on the image data after digital conversion in conformity with the characteristics of the display portion 30. After that, the image data transmitting portion 13 provides the image data with attribute information (such as information on which portion the image data is positioned in the whole screen) corresponding to each of the display units 40 and then transmits the image data as the image data D to each of the display units 40 through the transmission line 10L.

A-2. Display Control Portion 20

Figure 3:
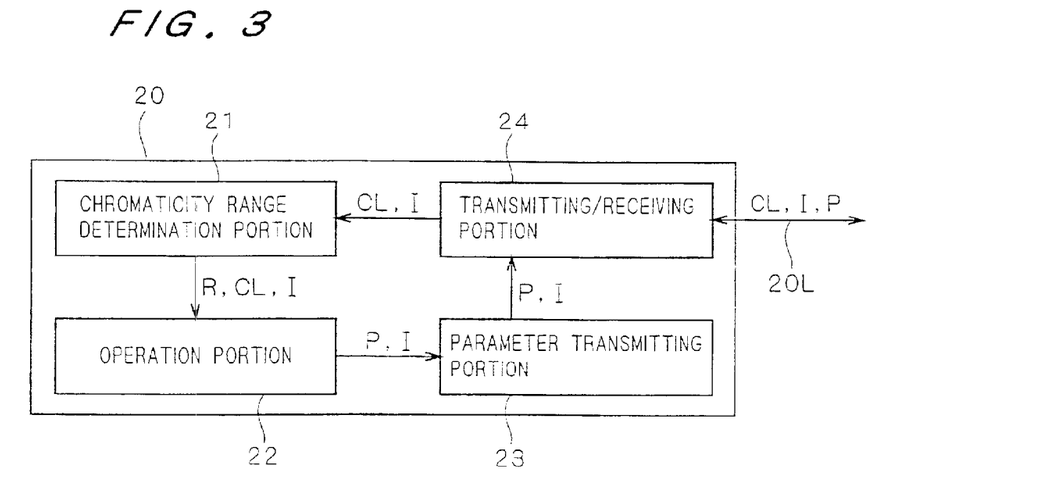
FIG. 3 is a view schematically showing a constitution of a display control portion in accordance with the first preferred embodiment of the present invention.

FIG. 3 is a view schematically showing a constitution of the display control portion 20 in accordance with the first preferred embodiment. The display control portion 20 comprises a chromaticity range determination portion 21, a parameter operation portion (also referred to simply as "operation portion" in the following discussion and the figures) 22, a parameter transmitting portion 23 and a display unit information transmitting/receiving portion (also referred to simply as "transmitting/receiving portion" in the following discussion and the figures) 24.

In more detail, the transmitting/receiving portion 24 performs a variety of communications with the display units 40 through the transmission line 20L. The chromaticity range determination portion 21 receives information CL on display characteristics (such as chromaticity information and luminance information) of each display unit 40 stored in a memory portion 42 (see FIG. 4) of the display unit 40 through the transmitting/receiving portion 24 and determines a predetermined chromaticity range R (as discussed later) on the basis of the display characteristics of all the display units 40. The operation portion 22 obtains chromaticity conversion parameter P for each display unit 40 on the basis of the chromaticity range R and the display characteristics of the display unit 40. Further, the chromaticity range R and the chromaticity conversion parameter P will be discussed later. The parameter transmitting portion 23 transmits the chromaticity conversion parameters P obtained in the operation portion 22 to the display units 40 through the transmitting/receiving portion 24.

A-3. Display Unit 40

Figure 4:
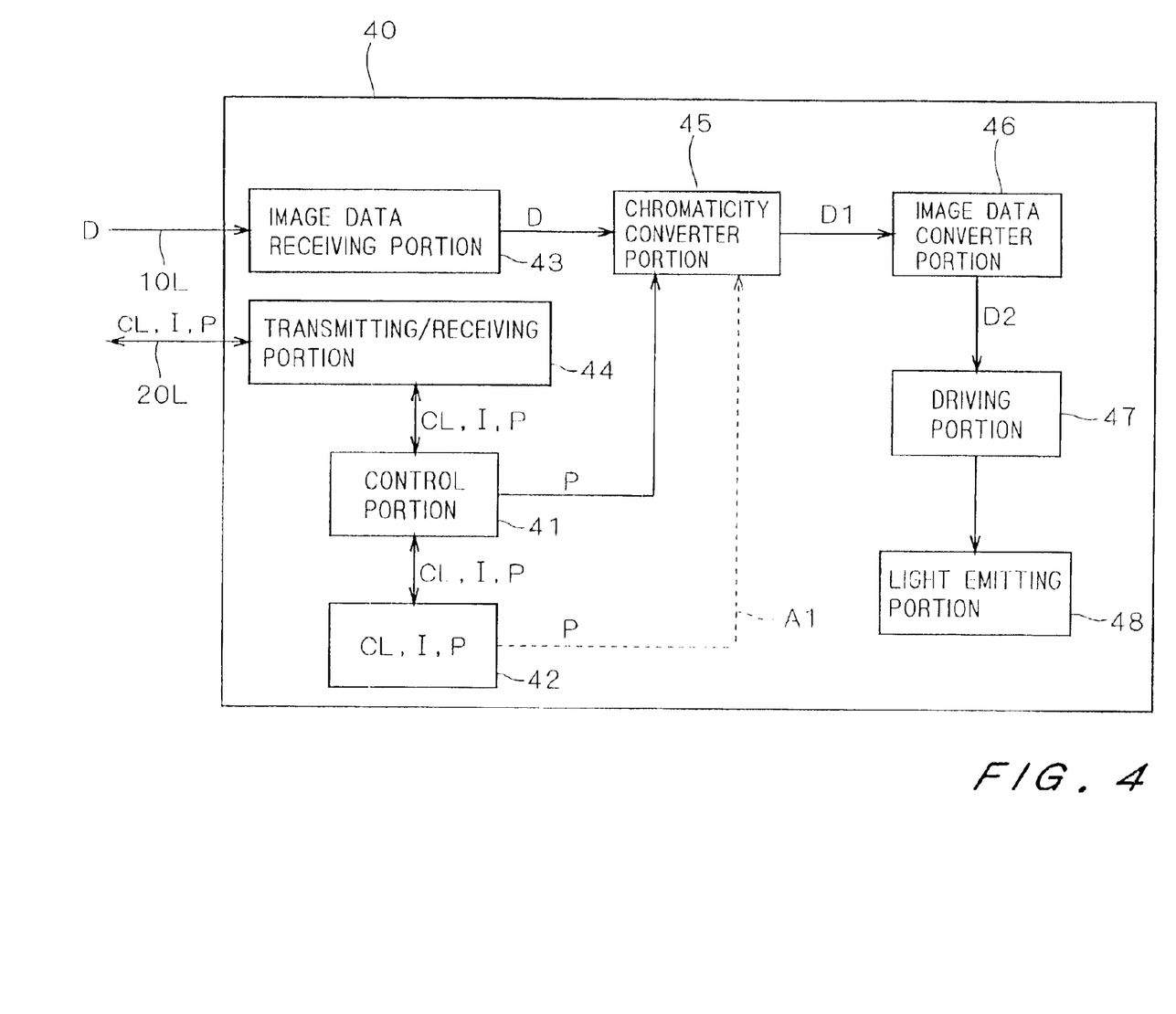
FIG. 4 is a view schematically showing a constitution of a display unit in accordance with the first preferred embodiment of the present invention.

FIG. 4 is a view schematically showing a constitution of the display unit 40 in accordance with the first preferred embodiment. The display unit 40 comprises a display unit information transmitting/receiving portion (transmitting/receiving portion) 44, a communication control portion (also referred to simply as "control portion" in the following discussion and the figures) 41, a memory portion 42, an image data receiving portion 43, a chromaticity converter portion 45, an image data converter portion 46, a light emitting portion 48 and a driving portion 47 for driving the light emitting portion 48.

In more detail, the light emitting portion 48 is constituted of a number of integrated LEDs (light emission diodes) for emitting the lights of e.g., red, green and blue, and emits a display light of the display units 40 or the display device 100.

The transmitting/receiving portion 44 performs a variety of communications with the transmitting/receiving portion 24 of the display control portion 20 through the transmission line 20L. The control portion 41 controls the transmitting/receiving portion 44, performs write and read operations of a variety of information and data to/from the memory portion 42, transmits the parameter P to the chromaticity converter portion 45 and so on. The memory portion 42 is made of e.g., a nonvolatile memory and stores information and data such as the display characteristics information (such as chromaticity information and luminance information) CL, the chromaticity conversion parameter P and a unit number of the display unit 40. Further, the display characteristics information CL such as chromaticity information and luminance information is obtained by measuring the characteristics of the light emitting portion 48 in advance and stored in the memory portion 42. As the chromaticity information, chromaticity coordinates of red, green and blue lights emitted by the light emitting portion 48 are used.

The image data receiving portion 43 receives the image data D through the transmission line 10L and transmits the data to the chromaticity converter portion 45. The chromaticity converter portion 45 receives the chromaticity conversion parameter P transmitted from the control portion 41 as well as the image data D. Then, the chromaticity converter portion 45 converts the chromaticity of the image data D on the basis of the chromaticity conversion parameter P and outputs image data D1 after conversion. The image data converter portion 46 receives the image data D1, converts the data D1 into a driving signal D2 suitable for the display element (herein, LED) and outputs the signal D2. The driving portion 47 drives the light emitting portion 48 on the basis of the driving signal D2.

B. Operation of Display Device 100

Next, an operation of the display device 100 will be discussed. The discussion will be made mainly on operation of the display device 100 in a case where another chromaticity conversion parameter P is set, such as immediately after another display portion 30 is assembled or immediately after some of the display units 40 constituting the display portion 30 are changed, First, the display control portion 20 receives the display characteristics information (such as chromaticity information and luminance information) CL and the unit number I held in each display unit 40 through the transmission line 20L. For example, the display control portion 20 transmits a request signal to the display units 40 when an operator performs a button operation and so on. Then, the control portion 41 of the display unit 40 which receives the request signal reads the display characteristics information CL such as chromaticity information and luminance information and the unit number I from the memory portion 42 and transmits the display characteristics information CL associated with the unit number I to the display control portion 20. The chromaticity range determination portion 21 of the display control portion 20 determines the predetermined chromaticity range R on the basis of all the received display characteristics information CL.

Now, a method of determining the chromaticity range R will be discussed. First, a target chromaticity range is represented on the chromaticity diagram as a triangle consisting of chromaticity coordinates of three primary colors. In the same manner, respective triangles for the display units 40 are represented on the basis of respective display characteristics information CL of the display units 40. Then, intersections between the target triangle and the triangles of the display units 40 are obtained. Next, an intersection between two of (a plurality of) obtained intersections is sequentially obtained. By repeating this operation of obtaining the intersection between two of the obtained intersections, an intersection of all the display units 40 is finally obtained. Vertices of the triangle of this final intersection are determined as a determined chromaticity range (predetermined chromaticity range) R for the display portion 30.

Figure 5:
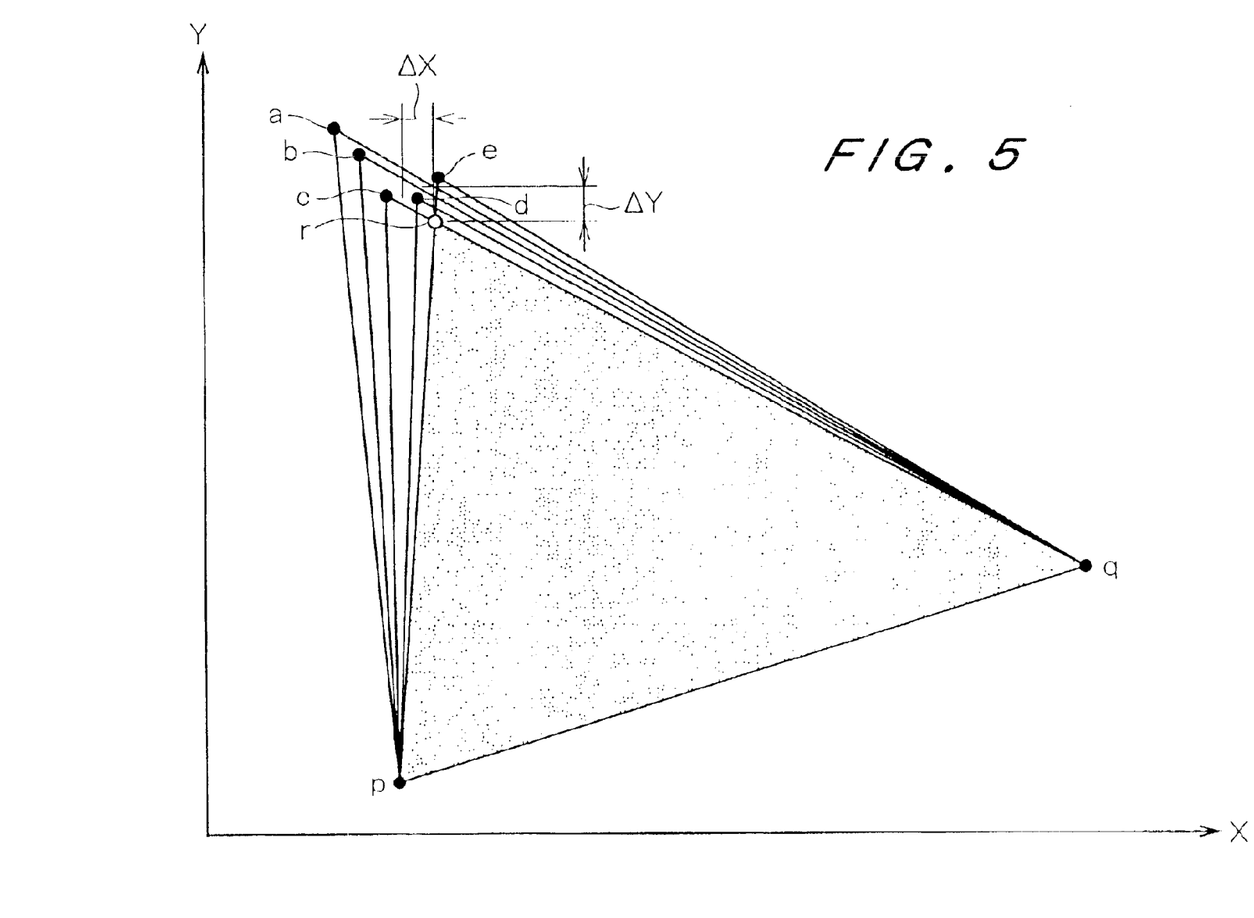
FIG. 5 is a schematic chromaticity diagram used for explaining a chromaticity range.

Further, in order to determine the determined chromaticity range R, the following method may be used. Specifically, the determined chromaticity range R may be defined inside a triangle which includes the above chromaticity range R (see triangle rpq in the schematic chromaticity diagram of FIG. 5) and is larger than the triangle rpq by a predetermined tolerance. As an example adopted is a triangle dpq having a point d within a range defined by the tolerance values $\Delta X$ and $\Delta Y$ form a point r in FIG. 5. In this case, the display unit 40 corresponding to triangles apq and bpq can perform a display within the chromaticity range of the triangle dpq while the display unit 40 corresponding to triangles cpq and epq has a chromaticity region which can not be displayed. Therefore, for the latter display unit 40 corresponding to the triangles cpq and epq, the common triangle rpq is defined as the determined chromaticity range R. By this determination method, it is possible to display an image in a wider chromaticity range within a tolerance of chromaticity unevenness.

Though the case where the above triangles have the points p and q in common is discussed above with reference to FIG. 5 for easy understanding, there are variations with respects to the points p and q among the triangles. In this case, the same operation as performed with respect to the point r should be performed with respect to the points p and q.

Further, the determined chromaticity range R may be obtained by other methods. Furthermore, among the coordinate spaces, any one of x-y coordinate system, u-v coordinate system and u'-v' coordinate system may be used as a criterion.

Thus, the chromaticity range determination portion 21 determines the chromaticity range common to all the display units or the chromaticity range made of the common chromaticity range and a tolerance (therefore, both ranges include the chromaticity range common to a plurality of display units 40 constituting the display portion 30) as the determined chromaticity range (predetermined chromaticity range) R.

Then, the chromaticity range determination portion 21 outputs the information on the obtained chromaticity range R (the reference character R also represents the chromaticity range information for convenience of discussion) and the display characteristics information CL and the unit number I of each display unit 40 to the operation portion 22.

The operation portion 22 obtains the chromaticity conversion parameters P such that the display units 40 can achieve the display within the chromaticity range R, specifically, points within the chromaticity range of the input image signal S can be converted into corresponding points within the determined chromaticity range R, for each of the display units 40. Further, as a method of determining the chromaticity conversion parameter, for example, a variety of methods disclosed in Japanese Patent Application Laid Open Gazette No. 8-317414 and the like may be applied. For example, the points within the chromaticity range of the input image signal S are converted into the corresponding points within the determined chromaticity range R by a predetermined mapping. Alternatively, the chromaticity points within the chromaticity range that the display unit 40 can not display may be converted into the points nearest to the determined chromaticity range R on a line connecting these chromaticity points out of the range and a white point. Further alternatively, the chromaticity points out of the range may be converted into the intersecting points between the chromaticity range R and the normals drawn from the points out of the range to the determined chromaticity range R. The chromaticity conversion parameter P is a parameter used for making such operations as above.

Then, the operation portion 22 outputs the chromaticity conversion parameter P and the unit number I to the parameter transmitting portion 23. The parameter transmitting portion 23 transmits the parameter P associated with the unit number I through the transmitting/receiving portion 24 and the transmission line 20L.

The control portion 41 of each display unit 40 receives the chromaticity conversion parameter P associated with the unit number I corresponding thereto through the transmitting/receiving portion 44, and transmits the parameter P to the chromaticity converter portion 45 and stores it into the memory portion 42. On the other hand, the image data receiving portion 43 receives the image data D from the image data generation portion 10 and transmits the data to the chromaticity converter portion 45. The chromaticity converter portion 45 converts the chromaticity of the image data D on the basis of the chromaticity conversion parameter P and outputs the converted image data D1 to the image data converter portion 46. The image data converter portion 46 converts the image data D1 into the driving signal D2 for LED and outputs the signal D2, and the driving portion 47 drives the light emitting portion 48 on the basis of the driving signal D2. Thus, the light emitting portion 48 emits the display light and an image is displayed on the display portion 30.

Further, since the chromaticity conversion parameter P is stored in the memory portion 42 as discussed above, it is not necessary to calculate the parameter P again unless the constitution of the display portion 30 is changed. In other words, the chromaticity converter portion 45 can perform chromaticity conversion by receiving the chromaticity conversion parameter P in the memory portion 42 through the control portion 41 during a usual operation. Furthermore, as indicated by the broken line A1 in FIG. 4, there may be a constitution in which the chromaticity converter portion 45 can directly access the memory portion 42.

The display device 100 can produce the following effects. First, since each of the display units 40 has the display characteristics information CL of the light emitting portion 48 or the operation portion 22 obtains the chromaticity conversion parameter P for each of the display units 40, it is possible to control the chromaticity of the display image for each of the display units 40. Therefore, an image of uniform color tone can be obtained on the whole display portion 30 in the display device 100. Moreover, since each of the display units 40 and the display control portion 20 are provided communicably with each other, the display device 100 can automatically the above chromaticity control.

<The Second Preferred Embodiment>

The operation portion 22 provided in the display control portion 20 of the display device 100 may be provided in the display portion 30. A display device having such a constitution will be discussed in the second preferred embodiment. Further, the following discussion will be made mainly on a difference between the display device of the second preferred embodiment and the display device 100, and constituent elements identical to already-discussed ones are given the same reference signs and the description thereof is omitted herein. This also applies to the third preferred embodiment discussed later.

Figure 6:
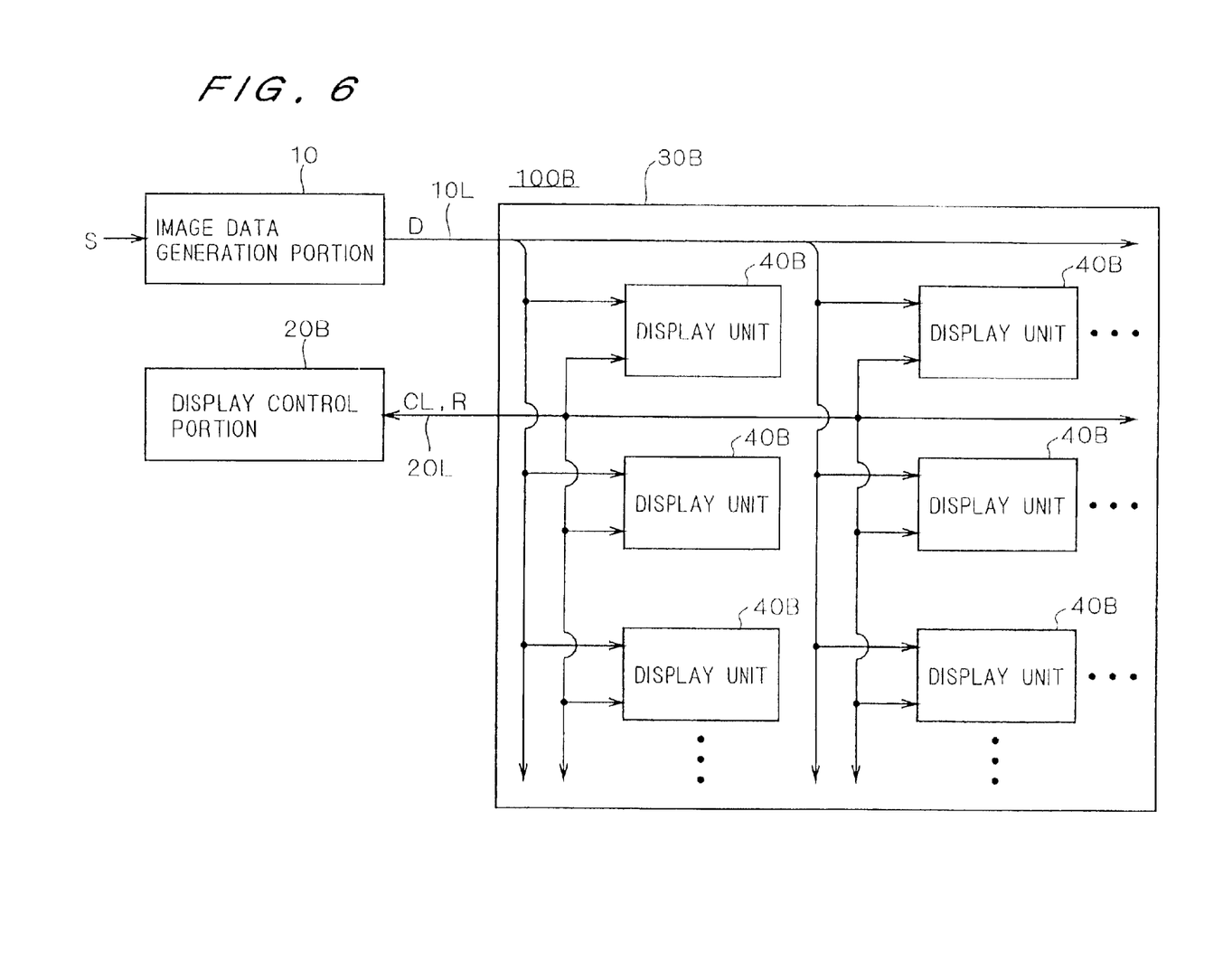
FIG. 6 is a view schematically showing a constitution of a display device in accordance with a second preferred embodiment of the present invention.

FIG. 6 is a view schematically showing a constitution of a display device 100B in accordance with the second preferred embodiment. The display device 100B comprises a display control portion 20B, a display portion 30B and the already-described image data generation portion 10. Further, the display portion 30B is constituted of a plurality of display units 40B which are arranged, e.g., in matrix.

Figure 7:
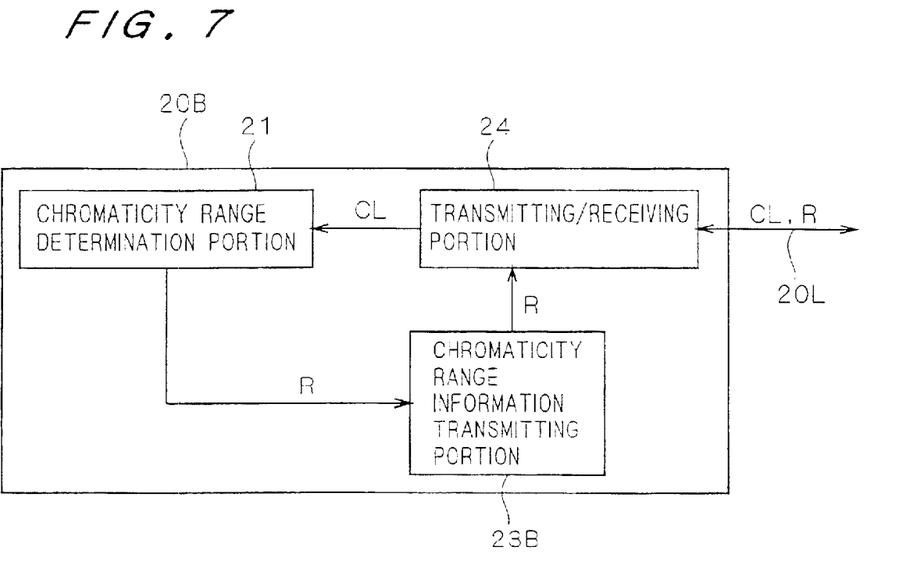
FIG. 7 is a view schematically showing a constitution of a display control portion in accordance with the second preferred embodiment of the present invention.

FIG. 7 is a view schematically showing a constitution of the display control portion 20B in accordance with the second preferred embodiment. As can be seen from a comparison between FIG. 7 and FIG. 3 discussed earlier, the display control portion 20B has no operation portion 22 and comprises a chromaticity range information transmitting portion 23B instead of the parameter transmitting portion 23. The chromaticity range information transmitting portion 23B receives the chromaticity range information R outputted from the chromaticity range determination portion 21 and transmits it through the transmitting/receiving portion 24 and the transmission line 20L.

Further, considering that the chromaticity range information R is information common (equal) to all the display units 40B, the chromaticity range determination portion 21 does not need to receive the unit number I of each display unit 40.

Figure 8:
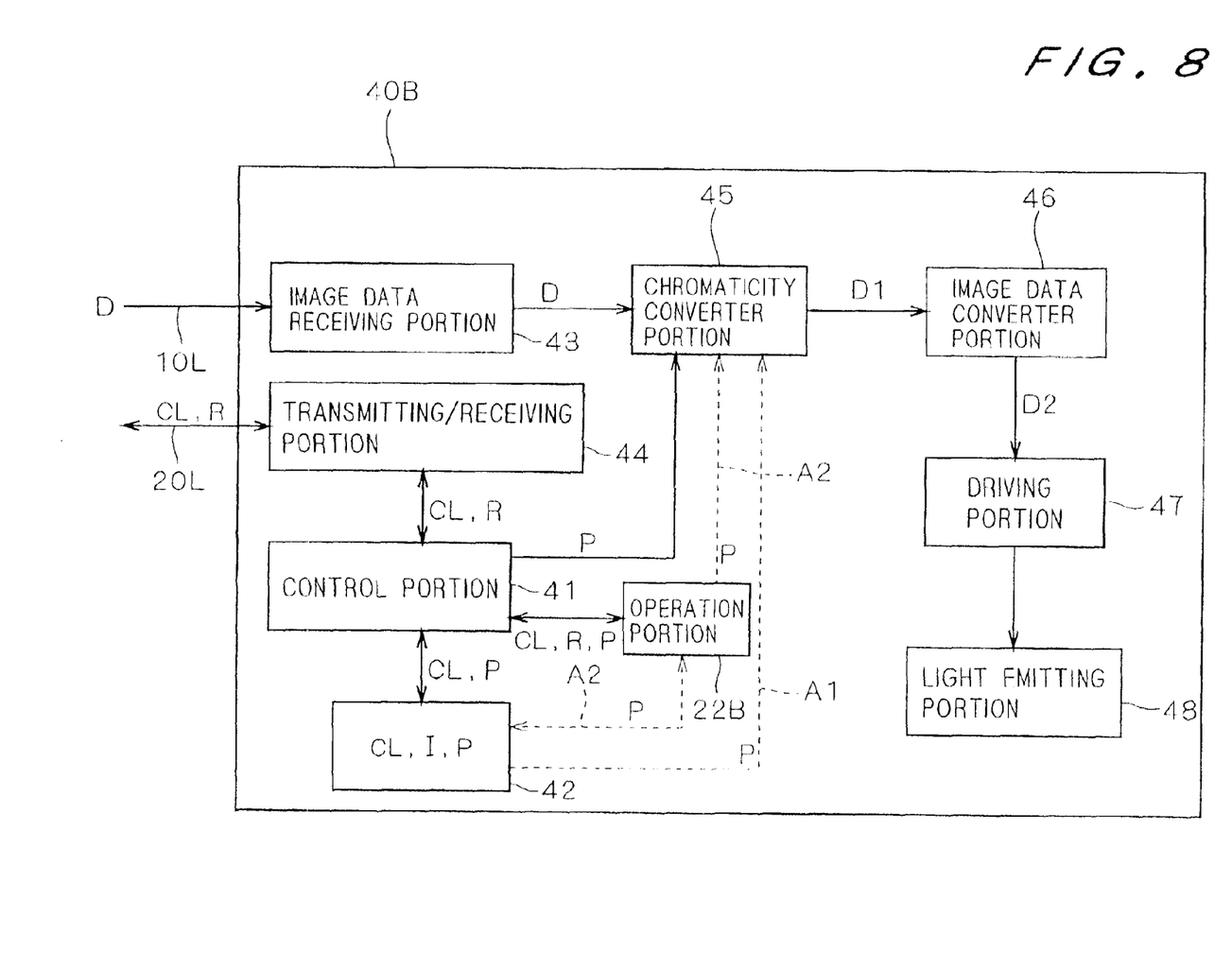
FIG. 8 is a view schematically showing a constitution of a display unit in accordance with the second preferred embodiment of the present invention.

FIG. 8 is a view schematically showing a constitution of the display unit 40B in accordance with the second preferred embodiment. As can be seen from a comparison between FIG. 8 and FIG. 4 discussed earlier, the display unit 40B has a basic constitution of the display unit 40 and additionally comprises a parameter operation portion 22B. The operation portion 22B calculates the chromaticity conversion parameter P like the already-described operation portion 22.

In more detail, the control portion 41 receives the chromaticity range information R through the transmitting/receiving portion 44 and transmits it and the display characteristics information CL to the operation portion 22B. The operation portion 22B obtains the chromaticity conversion parameter P in the same manner as the already-described operation portion 22 and passes the parameter P to the control portion 41. The control portion 41 outputs the parameter P to the chromaticity converter portion 45 and stores it into the memory portion 42. Further, as indicated by the broken line A2 in FIG. 8, there may be a constitution in which the operation portion 22B directly outputs the parameter P to the chromaticity converter portion 45 and directly stores it into the memory portion 42. The chromaticity converter portion 45, the image data converter portion 46, the driving portion 47 and the light emitting portion 48 operate like those in the display device 100.

Further, since the chromaticity conversion parameter P is stored in the memory portion 42 as discussed above, the chromaticity converter portion 45 can perform the chromaticity conversion as below during a usual operation. Specifically, the chromaticity converter portion 45 can receive the chromaticity conversion parameter P in the memory portion 42 through either or both of the control portion 41 and the operation portion 22B or directly (see the broken line A1 in FIG. 8).

The display device 100B can produce the following effects besides the above effects that the display device 100 produces. Specifically, since the operation portion 22B is provided inside each of the display units 40B, the chromaticity conversion parameters P can be obtained individually or in parallel in a unit of the display unit 40B. Further, since the chromaticity range information R is information common (or equal) to all the display units 40B, the chromaticity range information R can be transmitted to all the display units 40B collectively (or at the same time). Therefore, it is possible to reduce time for calculation of the chromaticity conversion parameter P and further time for control of the chromaticity as compared with the display device 100.

Further, in terms of cost for the display device, the display device 100 in which one operation portion 22 is provided inside the display control portion 20 is preferable.

<The Third Preferred Embodiment>

In the display device 100 or 100B, when there arises a problem in some of the display elements, the whole display unit 40 or 40B including the display element should be changed. In other words, in some cases, it is necessary to change a lot of display elements which have no problem. Then, a display device 100C which produces the same effects as the display device 100 produces and needs less number of parts to be changed than the display device 100 will be discussed in the third preferred embodiment.

A. Constitution of Display Device 100C and Display Unit 40C

Figure 9:
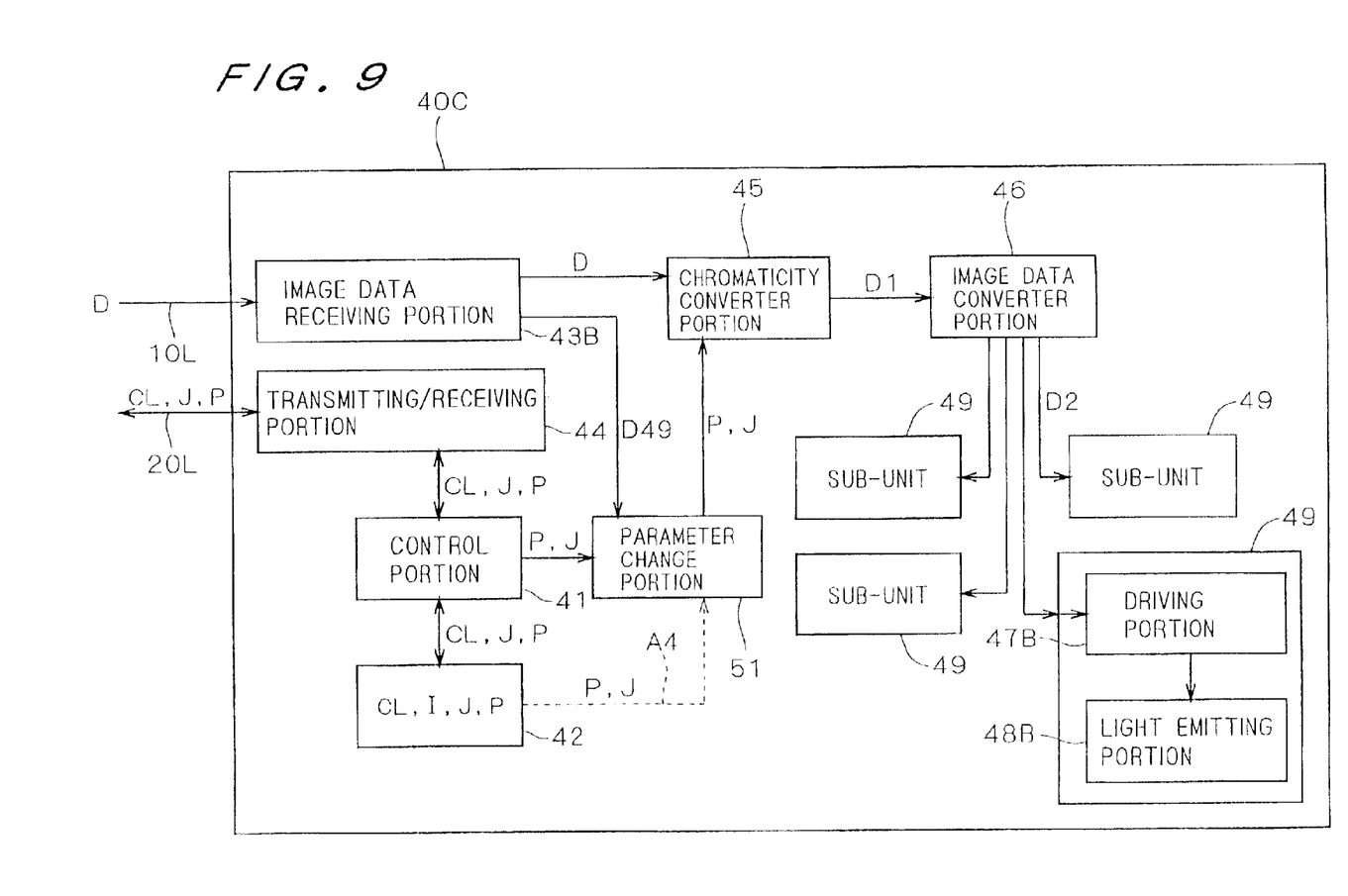
FIG. 9 is a view schematically showing a constitution of a display unit in accordance with a third preferred embodiment of the present invention.

FIG. 9 is a view schematically showing a constitution of a display unit 40C in accordance with the third preferred embodiment. The display device 100C (not shown) of the third preferred embodiment comprises a display portion 30C (not shown) constituted of a plurality of display units 40C which are arranged, e.g., in matrix, the image data generation portion 10 and the display control portion 20 both of which are already described.

As can be seen from a comparison between FIG. 9 and FIG. 4 discussed earlier, the display unit 40C comprises a plurality of sub-units 49 instead of the light emitting portion 48 and the driving portion 47 in the display unit 40. In more detail, in the display unit 40C, the already-described light emitting portion 48 is divided into a plurality of blocks (hereinafter, also referred to as "light emitting portions 48B") and each sub-unit 49 consists of one light emitting portion 48B and a driving portion 47B for the light emitting portion 48B. The driving portion 47B operates in the same manner as the already-described driving portion 47 operates. Further, FIG. 9 gives a detailed illustration of only one sub-unit 49 for simplification.

In such a constitution, the image data converter portion 46 outputs the driving signal D2 to each of the sub-units 49. Further, the display characteristics information (such as chromaticity information and luminance information) CL and the chromaticity conversion parameter P are defined for each of the sub-units 49 (therefore, for each of the light emitting portions 48B), and a sub-unit number J corresponding to the unit number I is given to each sub-unit 49. The display characteristics information CL and the chromaticity conversion parameter P are associated with the sub-unit number J and stored in the memory portion 42. For simple discussion, it is assumed that all the sub-unit numbers J are different in the display portion 30C.

The sub-unit 40C further comprises a parameter change portion 51 and a image data receiving portion 43B instead of the image data receiving portion 43. The image data receiving portion 43B operates in the same manner as the already-described image data receiving portion 43 and outputs image information D49 on which of the sub-units 49 (or the light emitting portions 48B) the received image data D is associated with to the parameter change portion 51.

B. Operation of Display Device 100C

Next, an operation of the display device 100C will be discussed. Since the display characteristics information CL and the like are defined for each of the sub-units 49, the display control portion 20 performs the following operation. Specifically, the display control portion 20 receives the display characteristics information CL for each of the sub-units 49 (therefore, for each of the light emitting portions 48B) associated with the sub-unit number J from all the display units 40C. The chromaticity range determination portion 21 determines the chromaticity range including the chromaticity range common to the all the light emitting portions 48B constituting the display portion 30C as the determined chromaticity range (predetermined chromaticity range) R on the basis of the display characteristics information CL of all the light emitting portions 48B constituting the display portion 30C. The operation portion 22 obtains the chromaticity conversion parameter P for each of the sub-units 49 (therefore, for each of the light emitting portions 48B) on the basis of the chromaticity range R and the display characteristics information CL for each of the sub-units 49. The display control portion 20 associates the chromaticity conversion parameter P with the sub-unit number J and transmits it to the display unit 40C.

The control portion 41 receives the chromaticity conversion parameter P for each of the sub-units 49 in the display unit 40C and passes it to the parameter change portion 51, and further associates the parameter P with the sub-unit number J and stores it into the memory portion 42.

The parameter change portion 51 receives the parameter P associated with the sub-unit number J, and receives the image information D49 from the image data receiving portion 43B. Then, the parameter change portion 51 outputs the parameter P for a predetermined sub-unit 49 corresponding to the image information D49 to the chromaticity converter portion 45. The chromaticity converter portion 45 converts the chromaticity of the image data D corresponding to each of the sub-units 49 (therefore, each of the light emitting portions 48B) on the basis of the parameter P and outputs the image data D1 (associated with the sub-unit number J).

The image data converter portion 46 receives the image data D1 and converts it into the driving signal D2 for the light emitting portion 48B, and then outputs the corresponding driving signal D2 to the predetermined sub-unit 49. The driving portion 47B drives the light emitting portion 48B on the basis of the driving signal D2.

Further, since the chromaticity conversion parameter P for each of the sub-units 49 is stored in the memory portion 42, the parameter change portion 51 can receive the parameter P from the memory portion 42 through the control portion 41 or directly (see the broken line A4 in FIG. 9) during a usual operation.

The display device 100C, which automatically converts the chromaticity of the image data on the basis of the chromaticity conversion parameter P for each of the light emitting portions 48B, can obtain an image of uniform color tone on the whole display portion 30C, like the display device 100.

Further, since the display unit 40C comprises a plurality of light emitting portions 48B, even if there arises a problem in some of the display elements, it is only necessary to change the sub-units 49 (therefore, the light emitting portions 48B) with the problem. In other words, it is possible to reduce the number of parts to be changed as compared with the display unit 40.

Furthermore, like the display device 100B, the operation portion 22 may be provided in the display unit 40C of the display device 100C. Such a constitution can produce the effects of the display device 100B and display device 100C at the same time.

<The Fourth Preferred Embodiment>

Figure 10:
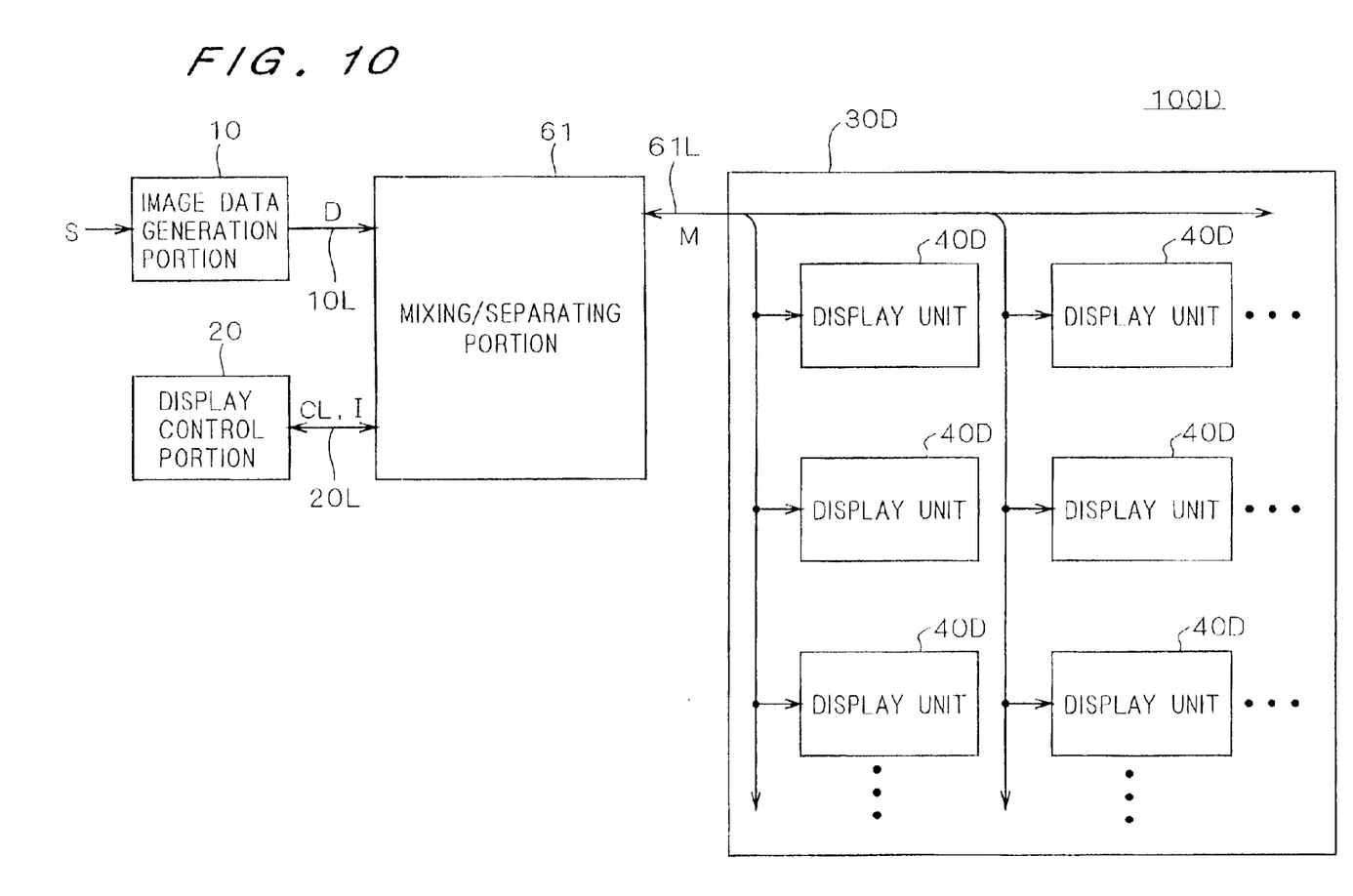
FIG. 10 is a view schematically showing a constitution of a display device in accordance with a fourth preferred embodiment of the present invention.
Figure 11:
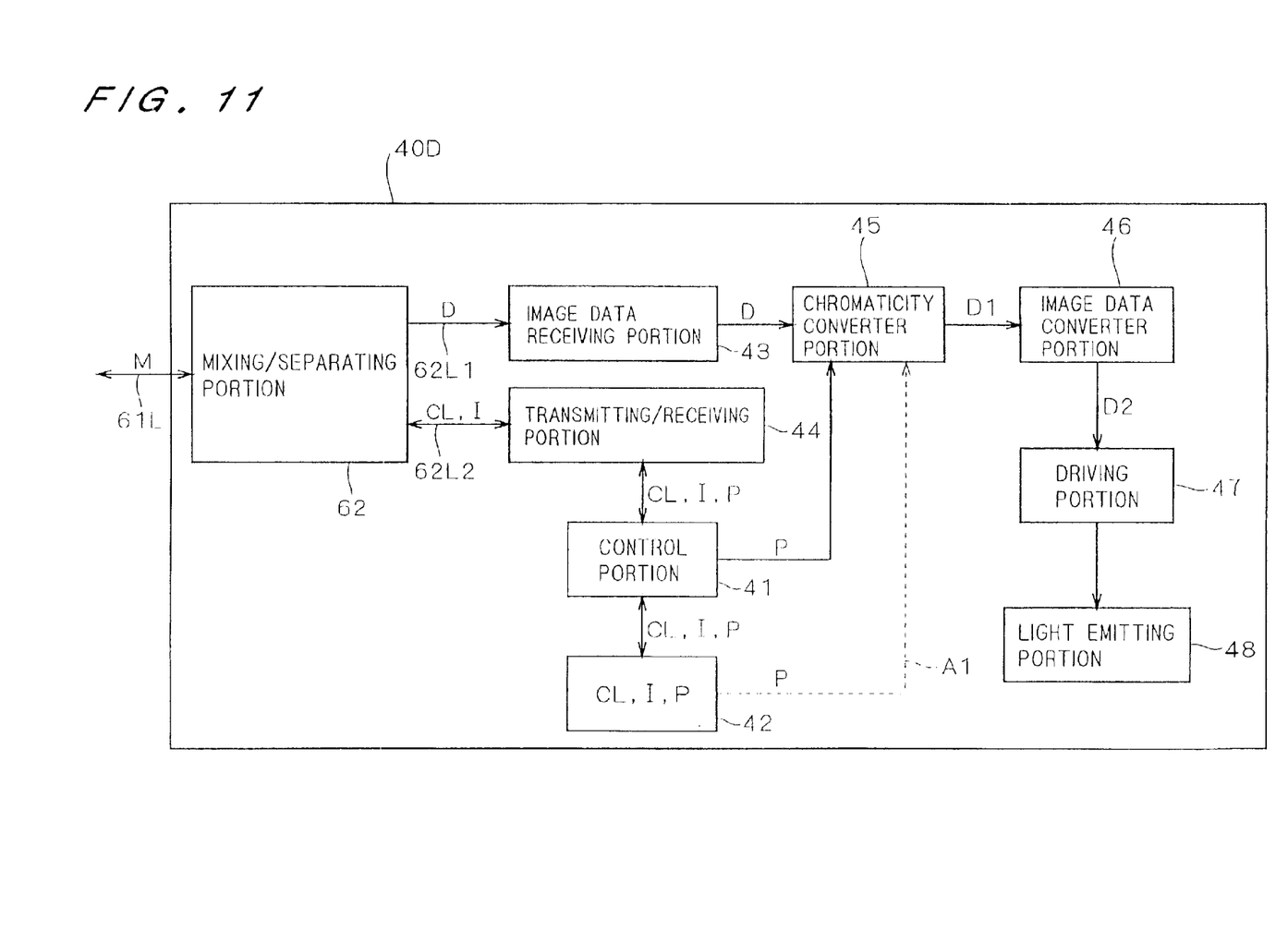
FIG. 11 is a view schematically showing a constitution of a display unit in accordance with the fourth preferred embodiment of the present invention.

FIGS. 10 and 11 are views schematically showing constitutions of a display device 100D and a display unit 40D in accordance with the fourth preferred embodiment. Further, a display portion 30D is constituted of a plurality of display units 40D which are arranged, e.g., in matrix. As shown in FIGS. 10 and 11, the display device 100D has a basic constitution of the display device 100 shown in FIG. 1 and additionally comprises a transmission signal mixing/separating portions (hereinafter, also referred to as "mixing/separating portions" in the following discussion and the figures) 61 and 62. Furthermore, the display unit 40D has the same constitution as the display unit 40 of FIG. 4 except the mixing/separating portion 62.

The mixing/separating portion 61 receives the image data D outputted from the image data generation portion 10 and a variety of communication signals (e.g., the request signal for receiving the chromaticity conversion parameter P, the display characteristics information CL and the like of the display unit 40D) outputted from the display control portion 20. The mixing/separating portion 61 mixes the image data D (which may be data in a form without the above attribute information) and the communication signals, add the attribute information of the image data thereto and associates it with the unit number I, to generate a mixed signal M. After that, the mixing/separating portion 61 outputs the mixed signal M to the display units 40D through a transmission line 61L.

On the other hand, the mixing/separating portion (or received-signal processing portion) 62 which is provided as an input stage of each display unit 40D receives the corresponding mixed signal M to separate it into the image data D and the communication signals and outputs the image data D to the image data receiving portion 43 through a transmission line 62L1 and the communication signals to the transmitting/receiving portion 44 through a transmission line 62L2.

When the communication signal is the request signal for the display characteristics information CL, the control portion 41 transmits the display characteristics information CL through the transmitting/receiving portion 44 and the mixing/separating portion 62 and the display control portion 20 receives it through the mixing/separating portion 61. Further, other constituent elements perform the same operations as discussed earlier.

The display device 100D can produce an effect of reducing the lines (see the transmission lines 10L, 20L and 61L) connected to the display units 40D as well as the above effects of the display device 100. Therefore, it is possible to facilitate interconnection in the display device and improve the workability in assembly work of the display device and the like.

Further, the mixing/separating portions 61 and 62 may be provided in the already-described display devices 100B and 100C, and the same effect can be produced.

<The First Variation>

Though the above discussion has been made on the case where the LED is used as the display element, a display element having an intrinsic luminescent chromaticity such as a cathode ray tube (CRT) and a discharge tube, other than the LED, may be applied. Further, the light emitting portion 48 or 48B may be made of a plurality of kinds of display elements.

While the invention has been shown and described in detail, the foregoing description is in all aspects illustrative and not restrictive. It is therefore understood that numerous modifications and variations can be devised without departing from the scope of the invention.

What is claimed is:

1. A display unit, a plurality of which are arranged to constitute a display portion of a display device, comprising:

a light emitting portion for emitting a display light;

a memory portion for storing display characteristics information of said light emitting portion for each of said plurality of said display units and further storing a chromaticity conversion parameter obtained on the basis of each of said stored display characteristics information from said pluraliy of display units, said display characteristics information is continuously stored in said memory portion even after said chromaticity conversion parameter is obtained; and a chromaticity converter portion receiving image data and said chromaticity conversion parameter, for converting chromaticity of said image data on the basis of said chromaticity conversion parameter.

2. The display unit according to claim 1, wherein said light emitting portion is divided into a plurality of blocks, and said information includes information on each of said plurality of blocks; and said chromaticity converter portion converts chromaticity of said image data for each of said blocks on the basis of said chromaticity conversion parameter for each of said plurality of blocks.

3. The display unit according to claim 2, further comprising:

an operation portion receiving chromaticity range information on a predetermined chromaticity range including a chromaticity range common to said plurality of display units constituting said display portion and said display characteristics information on each of said plurality of blocks, for obtaining said chromaticity conversion parameter for each of said plurality of blocks on the basis of said chromaticity range information and said display characteristics information on each of said plurality of blocks.

4. The display unit according to claim 1, further comprising:

a received-signal processing portion receiving a mixed signal in which a plurality of signals including said image data are mixed, for separating said mixed signal into said plurality of signals.

5. A display control device for controlling display of a plurality of display units which are arranged to constitute a display portion of a display device, each of said plurality of display units having a light emitting portion for emitting a display light and storing information including display characteristics information of said light emitting portion, said display control device being provided outside said plurality of display units interactively communicably therewith, and said display control device comprising:

a chromaticity range determination portion receiving said display characteristics information from each of said plurality of display units, for determining a predetermined chromaticity range including a chromaticity range common to said plurality of display units on the basis of all said display characteristics information.

6. The display control device according to claim 5, further comprising:

an operation portion receiving chromaticity range information on said predetermined chromaticity range and said display characteristics information on each of said plurality of display units, for obtaining a chromaticity conversion parameter for each of said plurality of display units on the basis of said chromaticity range information and said display characteristics information.

7. The display control device according to claim 5, wherein said light emitting portion of each of said plurality of display units is divided into a plurality of blocks, said information includes information on each of said plurality of blocks; and said chromaticity range determination portion determines a chromaticity range including a chromaticity range common to all said plurality of blocks of said plurality of display units as said predetermined chromaticity range on the basis of said display characteristics information of all said plurality of blocks.

8. The display control device according to claim 7, further comprising:

an operation portion receiving chromaticity range information on said predetermined chromaticity range and said display characteristics information on each of said plurality of said blocks, for obtaining said chromaticity conversion parameter for each of said plurality of blocks on the basis of said chromaticity range information and said display characteristics information on each of said plurality of blocks.

9. A display device, comprising:

a display portion constituted of a plurality of display units which are arranged;

a display control device provided outside said plurality of display units interactively communicably therewith, for controlling display of said plurality of display units; and on operation portion, wherein each of said plurality of display units comprises:

a light emitting portion for emitting a display light;

a memory portion for storing information including display characteristics information of said light emitting portion and a chromaticity conversion parameter obtained on the basis of said display characteristics information; and a chromaticity converter portion receiving image data and said chromaticity conversion parameter, for converting chromaticity of said image data on the basis of said chromaticity conversion parameter;

said display control device comprises:

a chromaticity range determination portion receiving said display characteristics information from each of said plurality of display units, for determining a predetermined chromaticity range including a chromaticity range common to said plurality of display units on the basis of all said display characteristics information, and said operation portion receives chromaticity range information on said predetermined chromaticity range and said display characteristics information on each of said plurality of display units, for obtaining said chromaticity conversion parameter for each of said plurality of display units on the basis of said chromaticity range information and said display characteristics information.

10. The display device according to claim 9, wherein said operation portion is provided inside said display control device, and said display control device transmits said chromaticity conversion parameter obtained in said operation portion to corresponding one of said plurality of display units.

11. The display device according to claim 10, wherein said light emitting portion of each of said plurality of display units is divided into a plurality of blocks, said information includes information on each of said plurality of blocks, said chromaticity converter portion of each of said plurality of display units converts chromaticity of said image data for each of said blocks on the basis of said chromaticity conversion parameter for each of said plurality of blocks, said chromaticity range determination portion of said display control device determines a chromaticity range including a chromaticity range common to all said plurality of blocks of said plurality of display units as said predetermined chromaticity range on the basis of said display characteristics information of all said plurality of blocks, and said operation portion provided inside said display control device receives chromaticity range information on said predetermined chromaticity range and said display characteristics information on each of said plurality of blocks, for obtaining said chromaticity conversion parameter for each of said plurality of blocks, on the basis of said chromaticity range information and said display characteristics information on each of said plurality of blocks.

12. The display device according to claim 9, wherein said operation portion includes a plurality of operation portions, each of said plurality of operation portions is provided inside said each of said plurality of display units, and said display control device transmits said chromaticity range information to said each of said plurality of display units.

13. The display device according to claim 12, wherein said light emitting portion of each of said plurality of display units is divided into a plurality of blocks, said information includes information on each of said plurality of blocks, said chromaticity converter portion of each of said plurality of display units converts chromaticity of said image data for each of said blocks on the basis of said chromaticity conversion parameter for each of said plurality of blocks, said chromaticity range determination portion of said display control device determines a chromaticity range including a chromaticity range common to all said plurality of blocks of said plurality of display units as said predetermined chromaticity range on the basis of said display characteristics information of all said plurality of blocks, and said operation portion provided inside each of said display units receives chromaticity range information on said predetermined chromaticity range and said display characteristics information on each of said plurality of blocks, for obtaining said chromaticity conversion parameter for each of said plurality of blocks on the basis of said chromaticity range information and said display characteristics information on each of said plurality of blocks.

* * * * *